United States Patent [19]

Watanabe et al.

[11] Patent Number: 4,682,641

[45] Date of Patent: Jul. 28, 1987

[54] SYSTEM FOR MANUFACTURE OF HIGH-LUG TIRES

[75] Inventors: Tadashi Watanabe; Shunichi Inoue, both of Tokyo, Japan

[73] Assignee: Bridgestone Corporation, Tokyo, Japan

[21] Appl. No.: 721,513

[22] Filed: Apr. 9, 1985

[30] Foreign Application Priority Data

Apr. 9, 1984 [JP] Japan .................................. 59-70531

[51] Int. Cl.⁴ ............................................ B29D 30/68
[52] U.S. Cl. .................................................... 157/13
[58] Field of Search ...................... 157/13; 51/DIG. 33

[56] References Cited

U.S. PATENT DOCUMENTS

| | | | |
|---|---|---|---|
| 3,487,872 | 1/1970 | Kiedrowski | 157/13 |
| 3,502,131 | 3/1970 | Rawls | 157/13 |
| 3,554,248 | 1/1971 | Chambers et al. | 157/13 X |
| 3,589,427 | 6/1971 | Love | 157/13 |
| 3,850,222 | 11/1974 | Lejuene | 157/13 |
| 4,072,072 | 2/1978 | Harb | 157/13 X |
| 4,080,230 | 3/1978 | Batchelor et al. | 157/13 X |
| 4,134,316 | 1/1979 | Bullinger | 157/13 X |

Primary Examiner—Frederick R. Schmidt
Assistant Examiner—Debra S. Meislin
Attorney, Agent, or Firm—Sughrue, Mion, Zinn, Macpeak & Seas

[57] ABSTRACT

A system of manufacturing a high-lug tire, wherein a portion of the tread of an unvulcanized tire is cut off to form quasi pattern grooves in substantially complementary relation to the shaping surface of a vulcanizing mold. Thereafter the unvulcanized tire is vulcanized in vulcanizing mold with the quasi pattern grooves matching the shaping surface of the vulcanizing mold. This reduces any flow of rubber during vulcanization of the tire.

7 Claims, 5 Drawing Figures

SYSTEM FOR MANUFACTURE OF HIGH-LUG TIRES

BACKGROUND OF THE INVENTION

The present invention relates to a method and an apparatus for manufacturing high-lug tires. More particularly it relates to a method and an apparatus for manufacturing tires having high lugs and deep grooves, such as tires for use with agricultural machinery (AG tires) or tires for use in off road conditions with construction machinery (OR tires).

It has been customary to manufacture high-lug tires by successively winding a carcass ply, a belt ply, and a tread rubber layer on a drum to form an unvulcanized tire. The unvulcanized tire is then placed into a vulcanizing mold while deforming the tire into a toroidal form, and then vulcanizing the tire. While the tire is being vulcanized, a portion of the tread rubber layer flows into grooves of the shaping surface of the vulcanizing mold and forms the lugs. Where the lugs are high, the rubber on the inner sides of the lugs, i.e., the rubber of the carcass ply and the belt ply is also caused by the rubber flow into the grooves to flow toward the grooves, resulting in recesses in the inner surface of the tire, which correspond to the lugs.

Because of the recesses, the tread rubber layer has a reduced gauge thickness in the vicinity of the bases of the lugs. To eliminate this difficulty, it has been conventional to increase the thickness of the winding tread rubber layer to compensate for such a reduction of the gauge thickness of the tread rubber layer. However, this practice has been disadvantageous in that the tread contains an excessive amount of material, making the tire heavy and requiring an additional quantity of rubber.

U.S. Pat. No. 3,850,222 describes a device for recapping tires and specifically for cutting a tread pattern in a tread rubber either prior to or after vulcanization of the recap rubber. The tire casting has been previously cast and is therefore circular and rigid. The electric cutting tool uses an hydraulic jack for support and is suspended by a cable. An operator guides the blade to cut along a previously disposed transverse groove. There is no support for the tire, none is needed since the casing is rigid. Rather, the tire itself serves to support a holding plate and guide rails for the cutting tool. Such a system would be unusable with an unvulcanized tire since no support is provided by the green tire casing. The tire requires support and the cutting device cannot rest on the tire or its weight would distort the cutting pattern.

U.S. Pat. No. 4,080,230 relates to a system of retreading tires and cutting a groove pattern in an unvulcanized tread strip placed over a vulcanized tire carcass. The cutting element is prealigned with the carcass and moves along predetermined arcs determined by a template. The cutting elements are mounted on gimbal supported arms to provide for pivoting action in both the horizontal and vertical planes. The system, while supporting the cutting arms merely fixes the position of the rigid carcass on a drive shaft for indexing the tire. There is no way to support a nonrigid green tire. The tread pattern cut is the final tread pattern.

SUMMARY OF INVENTION

In view of the foregoing problems with conventional tires made by prior art techniques, it is an object of the present invention to provide a method and an apparatus for manufacturing high-lug tires which are lightweight, inexpensive, and free from recesses in the inner surface thereof.

The above and other objects can be achieved by a method of manufacturing a high-lug tire, comprising the steps of: cutting off a portion of the tread of an unvulcanized tire to form quasi pattern of grooves in substantially complementary relation to the shaping surface of a vulcanizing mold; and thereafter vulcanizing the unvulcanized tire in the vulcanizing mold with the quasi pattern of grooves matching the shaping surface of the vulcanizing mold, thereby reducing any flow of rubber during vulcanization of the tire. The foregoing objects can also be accomplished by an apparatus for manufacturing a high-lug tire, comprising: support means for supporting an unvulcanized tire from inside thereof and moving the unvulcanized tire in a circumferential direction; a cutter for partially cutting off the tread of the unvulcanized tire; and drive means for moving the cutter to form a quasi pattern of grooves in the tread which are in substantially complementary relation to the shaping surface of a vulcanizing mold.

An embodiment of the present invention will be described with reference to the drawings and the description of the preferred embodiment.

DESCRIPTION OF THE PREFERRED EMBODIMENT

Figure 1:
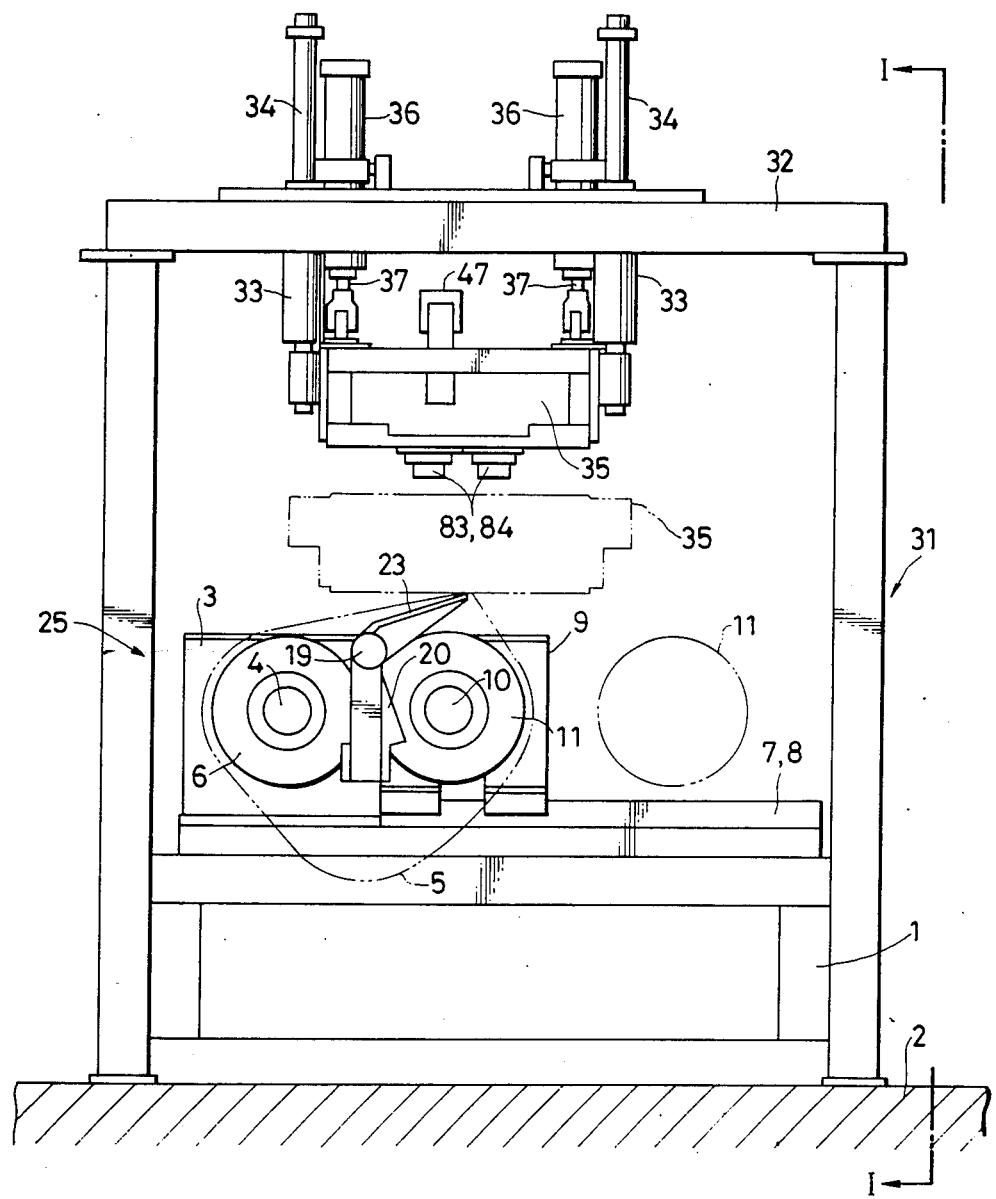
FIG. 1 is a front elevational view of an apparatus according to an embodiment of the present invention.
Figure 2:
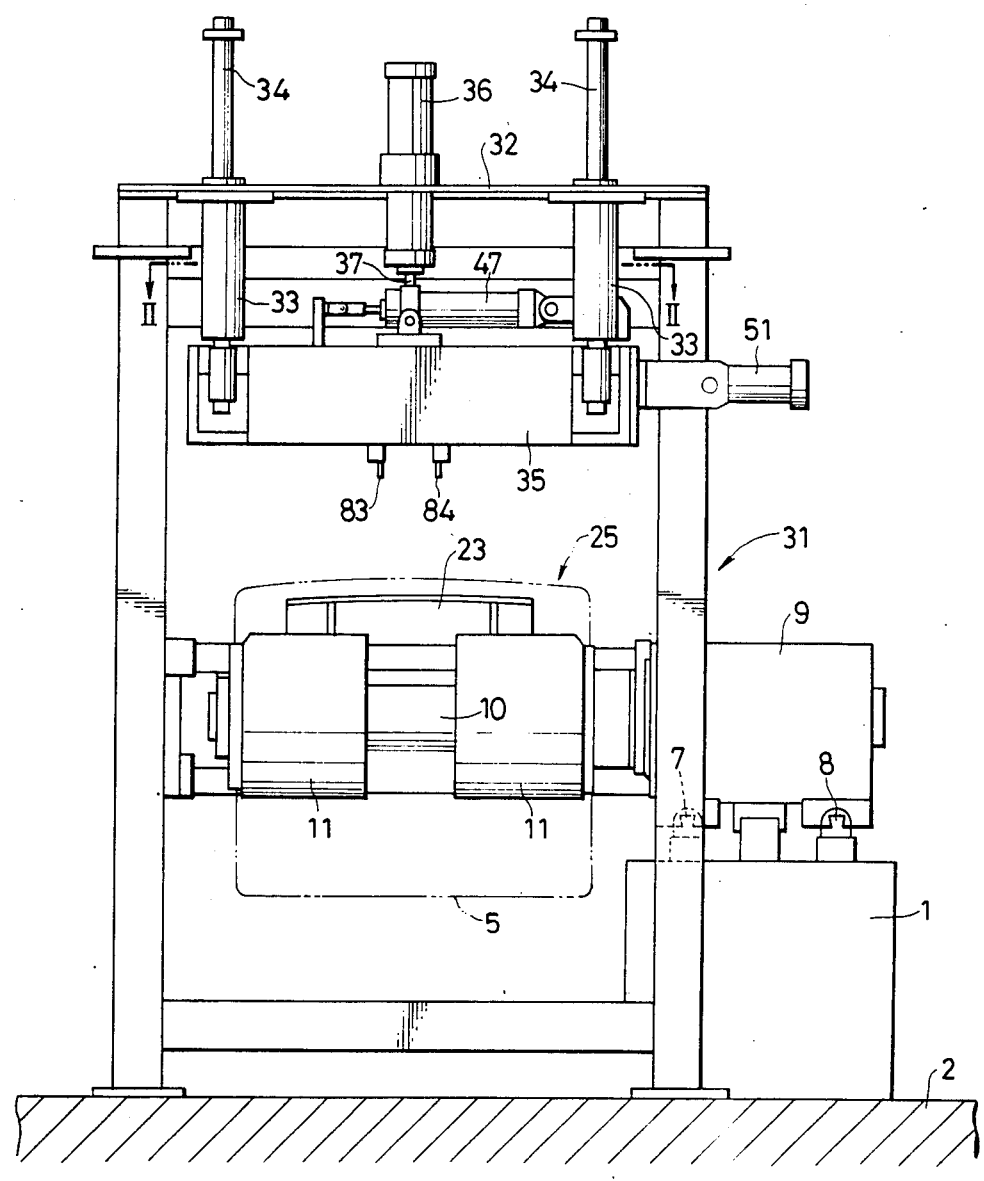
FIG. 2 is a side elevational view taken along line I—I of FIG. 1.

As shown in FIGS. 1 and 2, a support frame 1 installed on a floor 2 supports a box-shaped attachment base 3 mounted on an upper surface of the suport frame 1 at a lefthand end thereof. A horizontal rotatable shaft 4 extending in a longitudinal direction is rotatably supported on the attachment base 3. The rotatable shaft 4 is drivably coupled to a drive means such as a motor, not shown. On the rotatable shaft 4, a roller 6 is mounted, over which an unvulcanized tire 5 to be formed into a high-lug tire will be fitted.

A pair of horizontal guide rails 7, 8 are transversely mounted on the support frame 1 on the righthand side of the attachment base 3. A movable base 9 is slidably supported on the guide rails 7, 8. A rotatable shaft 10 parallel to the rotatable shaft 4 is rotatably supported on the movable base 9, the rotatable shaft 10 supporting a roller 11 similar to the roller 6. As shown in FIG. 2, each of the rollers 6, 11 is composed of two segments spaced in the axial direction of the rotatable shafts 4, 10. The rollers 6, 11 are parallel to each other, rotatable with respect to each other, and provided in a pair. The rollers 6, 11 are inserted into the unvulcanized tire 5 parallel to the axis thereof.

Figure 3:
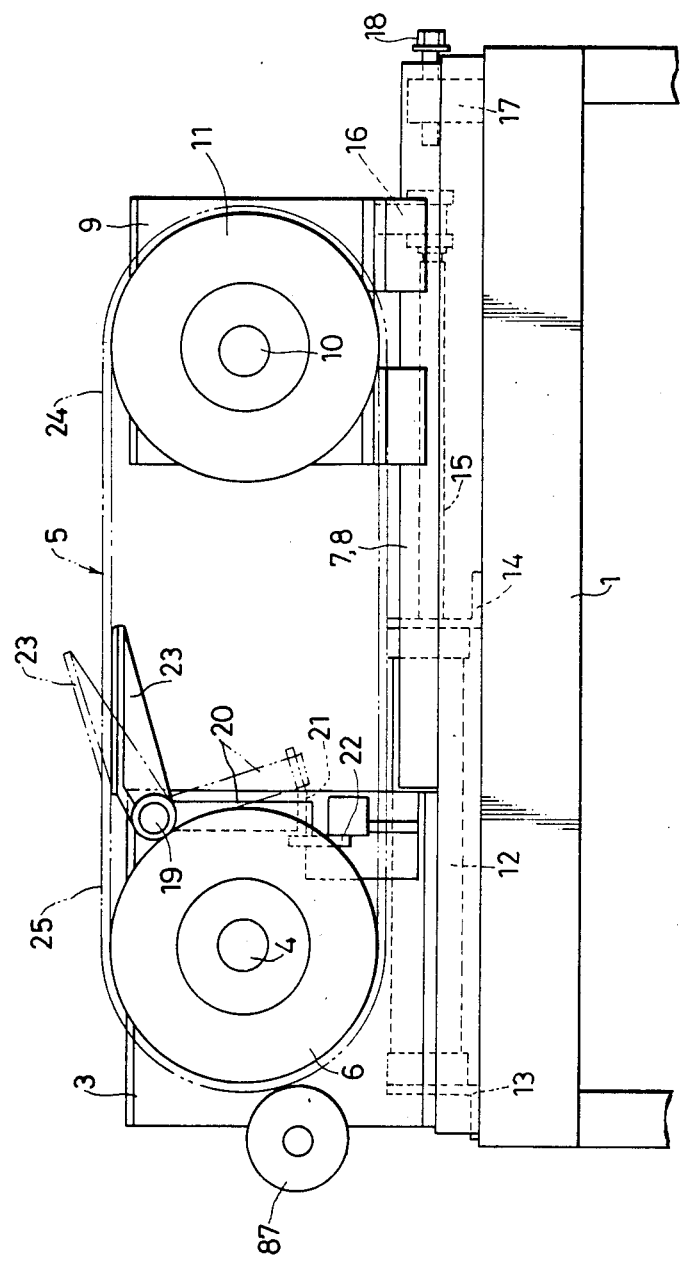
FIG. 3 is an enlarged front elevational view showing rollers and adjacent components.

As illustrated in FIG. 3, a cylinder 12 extending transversely to form a shifter mechanism is mounted by brackets 13, 14 on the support frame 1. The cylinder 12 has a piston rod 15 with its distal end coupled through a bracket 16 to the movable base 9. When the cylinder 12 is actuated, the movable base 9 transversely moves while being guided by the guide rails 7, 8. This moves the roller 11 toward and away from the roller 6. A block 17 is fixed to the righthand end of the suport frame 1, and a stopper bolt 18 limits the stroke of movement of the movable base 9 and is threaded through the block 17.

A pivot shaft 19 parallel to the rotatable shaft 4 is pivotally supported on the attachment base 3 on the righthand side of the rotatable shaft 4. A substantially downward extending arm 20 has an upper end fixed to the pivot shaft 19 and a lower end through which an adjustment screw 21 is threaded. When the arm 20 is angularly moved downwardly by gravity, the adjustment screw 21 abuts against a stopper 22 attached to the attachment base 3 to stop the angular movement of the arm 20. A support plate 23 is substantially flat and horizontal to the pivot shaft 19. As shown in FIG. 2, the support plate 23 has a longitudinally central portion curved upwardly at the longituiinal ends thereof. When the adjustment screw 21 is held against the stopper 22, the support plate 23 lies horizontal with its upper surface positioned slightly above a horizontal plane connecting upper edges of the rollers 6, 11. When the roller 11 approaches the roller 6, the support plate 23 engages an outer peripheral surface of the roller 11 and is angularly moved upwardly. This is illustrated by the phantom lines of FIG. 3. When the roller 11 is displaced away from the roller 6, the support plate 23 is angularly moved to a horizontal position as indicated by the solid lines in FIG. 3. When the support plate 23 is thus turned to the horizontal position, it is held in surface-to-surface contact with an inner surface of a flat run or stretch 24 of the unvulcanized tire 5 extending around and between the rollers 6, 11. The rollers 6, 11, the cylinder 12 forming the shifter mechanism, and the support plate 23 jointly constitute a support surface 25 for supporting the unvulcanized tire 5 from inside thereof and for moving the unvulcanized tire 5 in the circumferential direction thereof.

As shown in FIGS. 1 and 2, a frame 31 is installed on the floor 2 in a surrounding relation to the support surface 25. The frame 31 includes a top plate 32 to which two pairs of vertical guide sleeves 33 are secured. Vertical guide shafts 34 are slidably inserted respectively in the guide sleeves 33 and have lower ends to which a lifter table 35 is fixed. A pair of vertical cylinders 36 fixed to the top plate 32 have a pair of respective piston rods 37 with distal ends thereof coupled to the lifter table 35. Thus, when the cylinders 36 operate, the lifter table 35 is raised and lowered above the support plate 23.

Figure 4:
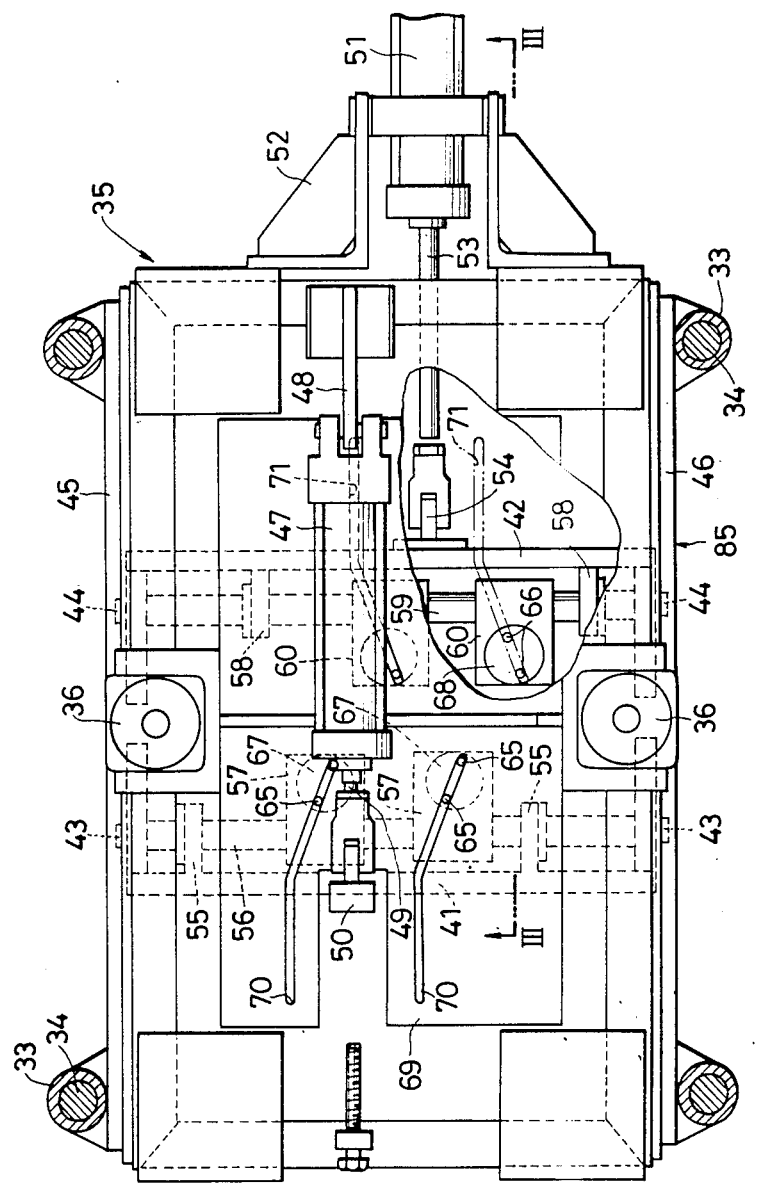
FIG. 4 is a cross-sectional view taken along line II—II of FIG. 2.
Figure 5:
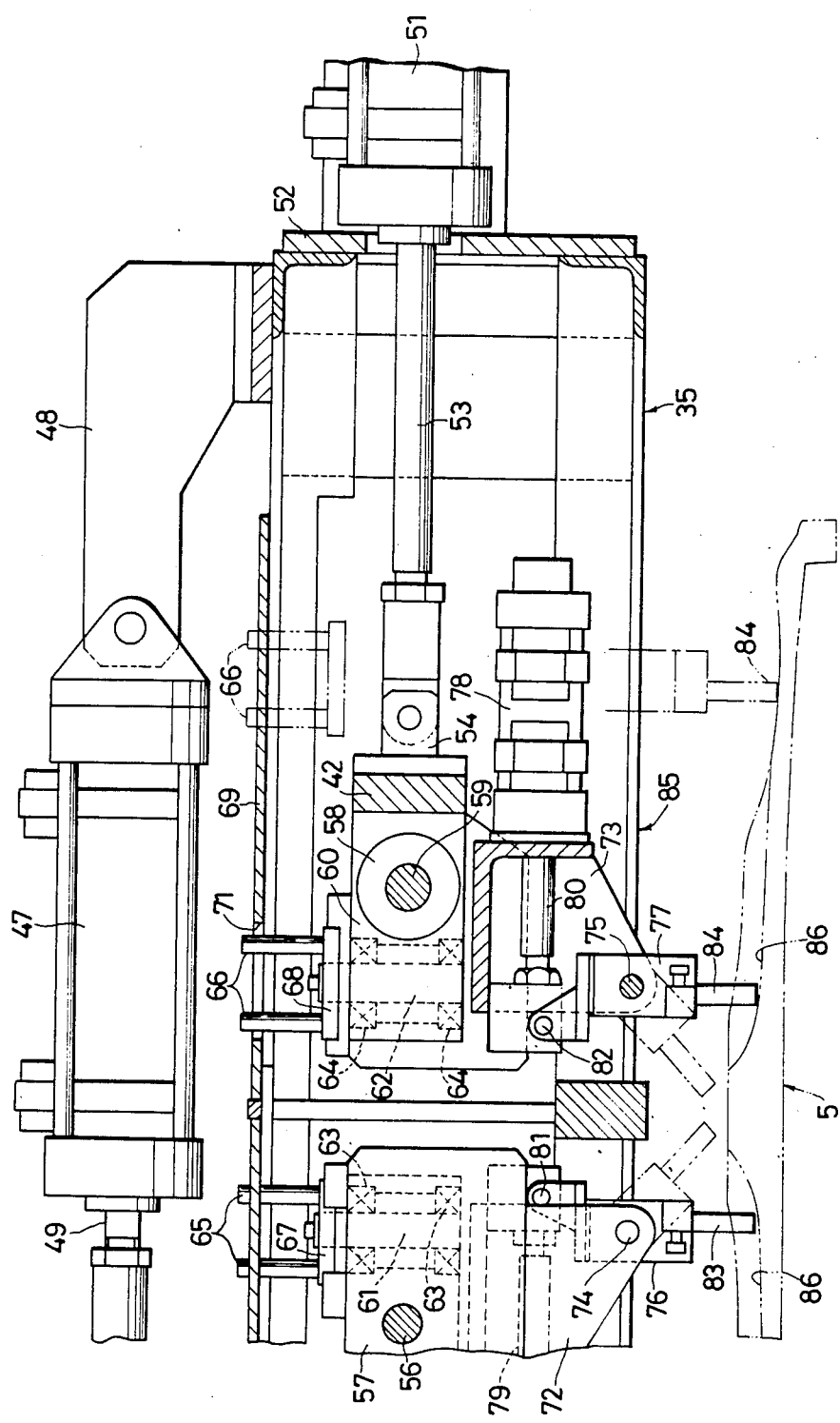
FIG. 5 is a cross-sectional view taken along line III-—III of FIG. 4.

As illustrated in FIGS. 4 and 5, a pair of longitudinally spaced, transversely extending movable plates 41, 42 are housed in the lifter table 35. Rollers 43, 44 are rotatably supported respectively on the transverse ends of each of the movable plates 41, 42. The rollers 43 move in guide grooves (not shown) defined in lefthand and righthand plates 45, 46 of the lifter table 34 and extend in a forward direction from the centers of the plates 45, 46. Thus, the rollers 43 guide longitudinal movement of the movable plate 41. The rollers 44 move in guide grooves (not shown) defined in the lefthand and righthand plates 45, 46 and extend in a rearward direction from the centers of the plates 45, 46. Thus, the rollers 44 guide longitudinal movement of the movable plate 42. The guide grooves in which the rollers 43, 44 engage are gradually inclined downwardly in a direction away from the center of the lifter table 35.

A longitudinal cylinder 47 is mounted by a bracket 48 on the upper surface of the lifter table 35. The cylinder 47 has a piston rod 49 with its distal end coupled by a bracket 50 to the movable plate 41. Another longitudinal cylinder 51 is mounted by a bracket 52 on the rear surface of the lifter table 35. The cylinder 51 has a piston rod 53 with its distal end coupled by a bracket 54 to the movable plate 42. When the cylinders 47, 51 operate, the movable plates 41, 42 are therefore moved longitudinally in the lifter table 35.

A pair of brackets 55 (FIG. 4) are attached to the movable plate 41. A transverse spline shaft 56 has opposite ends attached to the brackets 55, respectively. Two movable blocks 57 are splined to the spline shaft 56 between the brackets 55. The movable blocks 57 are not rotatable, but movable along the spline shaft 56. A pair of brackets 58 are attached to the movable plate 42. A transverse spline shaft 59 has opposite ends attached to the brackets 58, respectively. Two movable blocks 60 are splined to the spline shaft 59 between the brackets 58. The movable blocks 60 are not rotatable, but movable along the spline shaft 59. As shown in FIG. 5, vertical pivot shafts 61, 62 are rotatably supported by bearings 63, 64 in the movable blocks 57, 60 and support on upper ends thereof angularly movable disks 67, 68 on each of which a pair of upstanding pins 65, 66 are mounted.

In FIGS. 4 and 5, a cam plate 69 is attached to the upper surface of the lifter table 35 and has two pairs of angularly shaped guide grooves 70, 71 defined in front and rear portions of the cam plate 69. The pins 65, 66 are movably inserted in the guide grooves 70, 71. As a result, when the movable plates 41, 42 are moved longitudinally, the pivot shafts 61, 62 are changed in their angular positions, that is, turned about their own axes by the guide grooves 70, 71. Support brackets 72, 73 are fixed to the lower ends of the pivot shafts 61, 62. Cutter holders 76, 77 are angularly movably supported by transverse pivot shafts 74, 75 on the support brackets 72, 73. The support brackets 72, 73 are fixed to longitudinal cylinders 78 (only the cylinder for the support bracket 73 is shown), and have piston rods with their distal ends coupled by pins 81, 82 to upper ends of the cutter holders 76, 77, respectively. Consequently, operation of the cylinders 78 causes the cutter holders 76, 77 to turn about the pivot shafts 74, 75 between the solid-line position and the imagnary-line position of FIG. 5.

Cutters 83, 84 are fixed to the lower ends of the cutter holders 76, 77, respectively, for partially cutting off the tread rubber layer of the unvulcanized tire 5. Each of the cutters 83, 84 is in the form of a channel-shaped metal web. The guide shafts 34, the lifter table 35, the cylinders 36, the movable plates 41, 42, the rollers 43, 44, the cylinders 47, 51, the spline shafts 56, 59, the movable blocks 57, 60, the pivot shafts 61, 62, the pins 65, 66, the angularly movable disks 67, 68, the cam plate 69, the support brackets 72, 73, the cutter holders 76, 77, and the cylinder 78 jointly constitute a drive means 85 for three-dimensionally moving the cutters 83, 84. More specifically, the drive means 85 move the cutters 83, 84 along a predetermined path to cut off a portion of the tread rubber layer of the unvulcanized tire 5 to thereby form a quasi pattern of grooves 86 in the tread which are substantially complementary to the shaping surface of a vulcanizing mold to be used in a next tire manufacturing process.

The operation of the apparatus thus constructed will now be described.

The unvulcanized tire 5 is fitted over the rollers 6, 11 and the support plate 23 so that the rollers 6, 11 are inserted in the unvulcanized tire 5 parallel to the axis thereof. At this time, the roller 11 is positioned near the roller 6 as indicated by the solid lines in FIG. 1. Therefore, the unvulcanized tire 5 has its lower portion hanging down as shown in FIGS. 1 and 2. The roller 11 is held in engagement with the support plate 23, angularly moving the same upwardly as indicated by the solid lines in FIG. 1. The lifter table 35 is in an uppermost standby position as indicated by the solid lines in FIG. 1.

Then, the cylinder 12 is actuated to project the piston rod 15 thereof. The movable base 9 is guided by the guide rails 7, 8 and moved to the right away from the attachment base 3. When the base 9 moves, the roller 11 is disengaged from the support plate 23, which rotates downwardly by gravity about the pivot shaft 19 from the imaginary-line position to the solid-line position of FIG. 3. The angular movement of the support plate 23 terminates is stopped when the adjustment screw 21 engages the stopper 22. The support plate 23 now lies horizontally with its upper surface positioned slightly above the horizontal plane connecting the upper edges of the rollers 6, 11. When the movable base 9 has been moved a given distance and stopped, the unvulcanized tire 5 is maintained taut between the spaced rollers 6, 11, providing the substantially flat stretch 24 between the rollers 6, 11. At this time, the unvulcanized tire 5 is not rendered completely flat but slightly curved due to its own rigidity. The upper surface of the support plate 23 is positioned slightly above the horizontal plane connecting the upper edges of the rollers 6, 11 in order to match the curvature of the unvulcanized tire 5. The support plate 23 is held in surface-to-surface contact with the inner surface of the flat portion 24 to keep it flat. The cylinders 36 are then operated to project their respective piston rods 37. The lifter table 35 is then lowered from the solid-line position to the imaginary-line position of FIG. 1 while being guided by the guide shafts 34. At this time, the flat portion 24 with its lower surface supported by the support plate 23 is positioned directly below the cutters 83, 84.

A tire holder (not illustrated) is lowered to press the unvulcanized tire 5 against the support plate 23 for preventing the tire 5 from being displaced while it is being cut off. The cylinders 78 are actuated to project the piston rods 79, 80 to turn the cutter holders 76, 77 and hence the cutters 83, 84 about the pivot shafts 74, 75 from the imaginary-line position to the solid-line position of FIG. 5. The cutters 83, 84 are thus enabled to bite arcuately into the tread of the unvulcanized tire 5. Then, the cylinder 47 is actuated to project the piston rod 49 and the cylinder 51 is simultaneously actuated to withdraw the piston rod 53. The movable plates 41, 42 are now moved in forward and rearward directions, respectively, with the movable blocks 57 and the cutter 83, and the movable blocks 60 and the cutter 84, respectively. The cutters 83, 84 scrape off the tread of the unvulcanized tire 5 in a pattern of grooves, thus cutting off a portion of the rubber layer of the tread.

During this time, the tread is supported at its inner surface by the flat support plate 23, so that the desired rubber layer portion can be removed accurately and quickly even if the unvulcanized tire 5 is soft and flexible. Since the tread is kept flatwise while the rubber layer is being cut off, the path of movemet of the cutters 83, 84 is simpler than would be if the tread were maintained in a cylindrical form. Accordingly, the drive 85 for moving the cutters 83, 84 is structurally simplified. The movement of the cutters 83, 84 in the horizontal plane follows an angularly-shaped pattern since the pins 65, 66 move along the angularly-shaped guide grooves 70, 71. At this time, the disk 67, the cutter holder 76, the cutter 83, and the disk 68, the cutter holder 77, the cutter 84 are angularly moved to change their angular positions because the pins 65, 66 move in the guide grooves 71, 72. This turning movement of the cutters 83, 84 is effective to prevent the cutters 83, 84 from being inclined to the direction of advance thereof and hence from failing to cut off the rubber layer. As the cutting operation progresses, the cutters 83, 84 are gradually lowered since the rollers 43, 44 roll in and along the inclined guide grooves defined in the lefthand and righthand plates 45, 46. When the pins 66 and the cutter 84 reach the position indicated by the imaginary lines in FIG. 5, the cutting cycle is completed. Then, the cylinders 47, 51, 78 are operated to return the movable blocks 57, 70 to the solid-line position of FIG. 5, and also to return the cutters 83, 84 to the imaginary-line position.

Then, as shown in FIG. 3, the unvulcanized tire 5 is pressed against the roller 6 by means of a presser roller 87 to prevent slippage between the unvulcanized tire 5 and the roller 6. The rotatable shaft 4 is rotated with the roller 6 through a prescribed angular interval. Since the unvulcanized tire 5 is stretched under tension between the rollers 6, 11, the roller 11 is also rotated by the unvulcanized tire 5 to bring an uncut tread portion readily and quickly to a position directly below the cutters 83, 84. Then, the tread is cut-off in the same cutting cycle as described above. The tread rubber layer is partially cut-off at successive portions while the unvulcanized tire 5 is intermittently moved circumferentially by the rotation of the rollers 6, 11, thus forming a quasi pattern of grooves 86 in the surface of the tread. The quasi pattern of grooves 86 are substantially complementary to the shaping surface of the vulcanizing mold in which to vulcanize the tire 5 in a next tire manufacturing process. However, the quasi pattern of grooves 86 differ from the specific details of the shaping surface of the vulcanizing mold.

The unvulcanized tire 5 with the quasi pattern of grooves 85 formed thereon is removed from the rollers 6, 11 which are maintained close to each other, and is then transferred to the next vulcanizing process. In the vulcanizing process, the tire 5 is vulcanized with the shaping surface of the vulcanizing mold matching the quasi pattern of grooves 86 on the tire 5. Since the shaping surface and the quasi pattern of grooves 86 are substantially complementary to each other, any flow of the rubber as it is vulcanized is small. This eliminates any tendency to form recesses in the inner side of the lugs upon the flow of the rubber into the grooves in the mold.

In the foregoing embodiment, the roller 11 is movable toward and away from the roller 6. However, the roller 6 may be moved toward and away from the roller 11, or both rollers 6, 11 may be moved with respect to each other. Furthermore, the support plate 23 may be detachably mounted so that it can be detached and not interfere with the unvulcanized tire 5 as it is removed or attached. The detachable support plate 23 should be detached and attached when the rollers 6, 11 are spaced apart from each other, and such detachment and attachment may efficiently be performed by the use of a cylinder or the like.

With the present invention, as described above, high-lug tires which are lightweight, inexpensive, and free from recesses on inner surfaces thereof can be manufactured.

It is apparent that modifications of this amendment may be practiced without departing from the essential scope of this invention.

We claim:

1. An apparatus for manufacturing a high-lug tire, comprising: support means for supporting an unvulcanized tire from inside thereof and for moving said unvulcanized tire in a circumferential direction; a cutter assembly for partially cutting off the tread of the unvulcanized tire; and dirve means for moving said cutter assembly to form a quasi pattern of grooves in said tread which are in substantially complementary relation to the shaping surface of a vulcanizing mold, wherein said support means comprises a pair of rotatable parallel rollers inserted in the unvulcanized tire parallel to an axis thereof; a shifter mechanism for moving said rollers with respect to each other; and a substantially flat support plate arranged for surface-to-surface contact with an inner surface of a flat portion of the unvulcanized tire when it is tensioned between said rollers as they are moved apart from each other.

2. The apparatus of claim 1, wherein said support plate is mounted to selectively engage one of said rollers and pivot into said surface-to-surface contact, and stop means terminate pivoting movement of said support plate.

3. The apparatus for claim 1, wherein said shifter mechanism comprises a movable base means to rotatably support one of said rollers on said base and means to reciprocate said movable base.

4. The apparatus of claim 3, further comprising a pair of guide rails for defining the travel of said movable base and wherein said means to reciprocate comprises a cylinder and piston assembly coupled to said movable base.

5. The apparatus of claim 1, wherein said drive means for moving said cutter comprises a lifter table movable between a cutting position and a retracted position, means mounted on said lifter table for moving said cutter assembly and guide means for controlling the movement of said cutter assembly.

6. The apparatus of claim 5, wherein said guide means comprises a guide groove attached to said lifter table and a pin inserted in said guide groove and attached to said means mounted on said lifter table for moving said cutter assembly.

7. The apparatus of claim 5, wherein said means mounted on said lifter table for moving said cutter assembly comprises a movable plate supported on said lifter table, a roller to guide movement of said movable plate, an actuating cylinder for driving said movable plate in one direction, a cutter holder operably coupled to said movable plate and means to rotate said cutter holder.

* * * * *